(12) United States Patent
Gaudin

(10) Patent No.: US 8,404,112 B2
(45) Date of Patent: Mar. 26, 2013

(54) FILTER MEDIA FOR USE IN POOL FILTERS

(75) Inventor: Ray Gaudin, Ponte Vedra Beach, FL (US)

(73) Assignee: Industrial Insulation Group, LLC, Brunswick, GA (US)

(*) Notice: Subject to any disclaimer, the term of this patent is extended or adjusted under 35 U.S.C. 154(b) by 436 days.

(21) Appl. No.: 12/839,640

(22) Filed: Jul. 20, 2010

(65) Prior Publication Data

US 2011/0127224 A1    Jun. 2, 2011

Related U.S. Application Data

(60) Provisional application No. 61/227,616, filed on Jul. 22, 2009.

(51) Int. Cl.
*B01D 24/12* (2006.01)
*B01D 24/14* (2006.01)
*E04H 4/12* (2006.01)

(52) U.S. Cl. .................................. 210/167.13; 210/290

(58) Field of Classification Search ............... 210/167.1, 210/167.12, 167.13, 290
See application file for complete search history.

(56) References Cited

U.S. PATENT DOCUMENTS

| 4,997,558 | A  | * | 3/1991 | Baker ............................ 210/143 |
| 6,274,052 | B1 | * | 8/2001 | Hartwig ........................ 210/760 |
| 7,157,009 | B2 | * | 1/2007 | Nichols et al. ................ 210/721 |
| 7,252,761 | B2 | * | 8/2007 | Lamberts Van Assche ................... 210/167.12 |

FOREIGN PATENT DOCUMENTS

| DE | 19734390 A1 | * | 2/1999 |
| DE | 10318708 A1 | * | 11/2004 |

* cited by examiner

*Primary Examiner* — Fred Prince
(74) *Attorney, Agent, or Firm* — Leason Ellis LLP

(57) ABSTRACT

A sand filter for use with swimming pools includes a tank that has a hollow interior space and a top diffuser for allowing spent pool water to enter the tank and for distributing the pool water inside the tank. The sand filter also includes filter media formed as a bed of material on a bottom of the tank and also includes laterals that are located under the filter media and allow filtered pool water to exit the tank and flow back to the pool. The filter media includes a bed of sand that is disposed on the bottom of the tank and a layer of perlite material that is disposed on a top surface of the bed of sand. The perlite material is a high flow rate, low density perlite material that only contains a trace amount of floaters.

14 Claims, 5 Drawing Sheets

Figure 1:
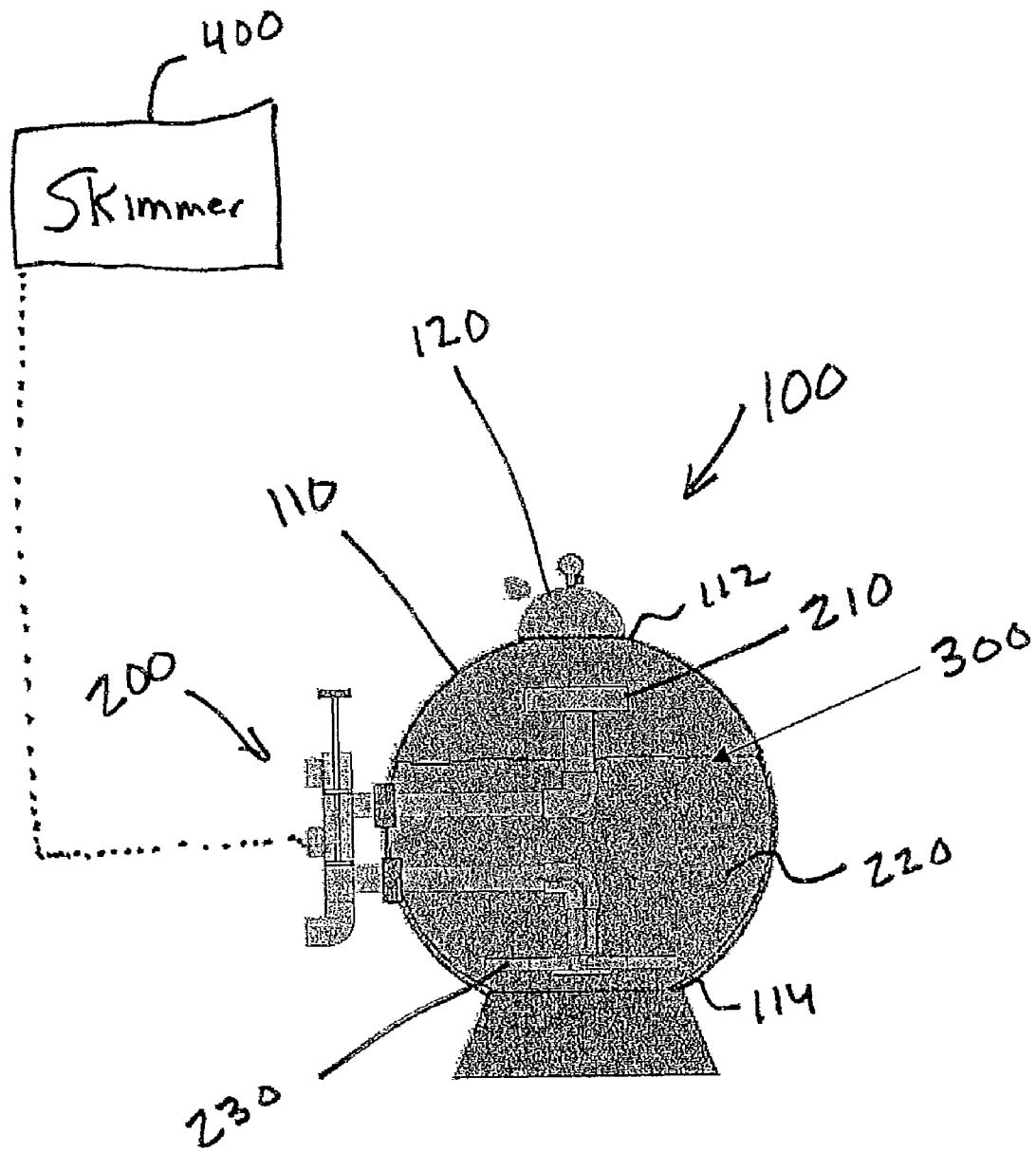

Figure 2. Percent Removals of *Cryptosporidium*-sized Microspheres for Individual Sand Filter Experiments (with and without Perlite)

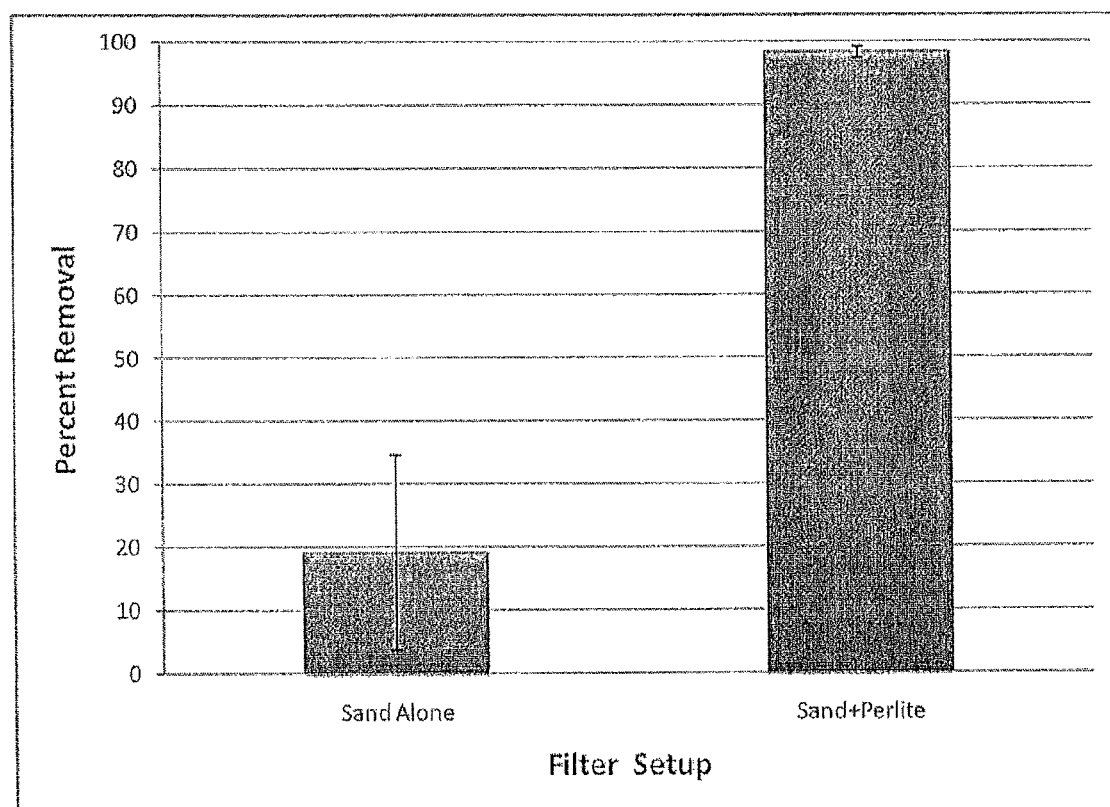
Figure 3. Mean Percentage Removals of *Cryptosporidium*-sized Microspheres for Sand Filter Experiments (with and without Perlite)

Figure 4. Log Removals of *Cryptosporidium*-sized Microspheres for Individual Sand Filter Experiments (with and without Perlite)

Figure 5. Mean Log Removals of *Cryptosporidium*-sized Microspheres for Sand Filter Experiments (with and without Perlite)

FILTER MEDIA FOR USE IN POOL FILTERS

CROSS-REFERENCE TO RELATED APPLICATION

The present application claims the benefit of U.S. patent application Ser. No. 61/227,616, filed Jul. 22, 2009, which is hereby incorporated by reference in its entirety.

TECHNICAL FIELD

The present invention relates to swimming pools, and more particularly, to a filter media for use in a sand type swimming pool filter or the like for reducing bacteria levels (e.g., cryptosporidium levels) and for promoting improved water characteristics.

BACKGROUND

In many regions of the country, a high percentage of homes have outdoor swimming pools. Pools must be sanitized to prevent growth and spread of bacteria, viruses, algae and insect larvae that can cause disease. Swimming pool water must contain low levels of bacteria and viruses to prevent the spread of diseases and pathogens between users. This is typically done by using filters, ensuring that the pools have adequate flow rate and chemical disinfectants, such as chlorine, bromine or mineral sanitizers. Pumps and mechanical filters are often used to filter pathogens out of the water and chemical disinfectants, such as bromine, are used to make the water inhospitable to pathogens.

There are three main types of swimming pool filters, namely, a DE (Diatomaceous Earth) type filter; and a cartridge type filter and a sand type filter.

DE filters use diatomaceous earth to filter particles out of the water. The filters are composed of plastic grids inside of a plastic type of fabric. DE powder coats the grids and filters out tiny debris. If the pressure rises in the filter, the system automatically backwashes, similar to a sand filter, recharging itself with more DE powder. DE filters can cause some inefficiency and water flow loss because they tend to run at a higher pressure than cartridge filters.

Cartridge filters are considered to be the most economically low in maintenance. Water runs through a filter inside this particular system, catching any debris. It is very similar to water filtering systems that are used in homes. These type of pool filters do not clog up as much as the other pool filters, and two types of filter elements can be used in the cartridge filter system. The less expensive elements may be cheaper to replace, but they also need replaced more frequently. The more expensive elements tend to last longer. Cartridge filters are created to run on lower pressure. They filter out more particles than sand but not as many as DE filters. These filters can be cleaned once or twice during the swimming season by simply hosing them off with water.

The most inexpensive of the three kinds of pool filters are the sand filters. This type of filter works by filtering water through a bed of sand. Lateral tubes at the bottom of the sand then separate the clean water from the dirty water. Water is pushed through the filter sand, and as the filter separates the water, the dirty water is sent to the top while the clean water exits through the bottom. Debris can plug up and block sand filters which causes the pressure to increase in the filter and a drop in the flow of water. This can be fixed by running the system in reverse to backwash the filter, leaving it cleaned. The filter is then placed on its rinse mode where it repacks the sand back into the filter. Maintenance on a sand filter can be done manually every couple of weeks to keep the sand filter in proper working order. Sand filters are inexpensive and easy to replace. The downside to owning a sand filter is that it does not remove small particles that the DE and cartridge filters are capable of removing.

A conventional sand filter includes a vessel or tank that holds the sand and other internal parts and includes a multi port valve or control valve which permits a number of different functions to be selected and performed. For example, the following functions are commonly found on a standard multi port valve: (1) filter: normal filtering and vacuuming; (2) backwash: for cleaning the filter bed of accumulated debris; (3) rinse: use after completing the backwash cycle to ensure all dirty water is rinsed from the tank to waste; (4) waste: by-passes the tank for draining or lowering the pool water level and for vacuuming heavy debris directly to the waste line; (5) recirculate: water is recirculated through the valve by-passing the filter; and (6) closed: shuts off the flow from the pump to the filter. The internal parts of the filter include: (1) a top diffuser that allows the pool water to enter the tank and distributes the water inside the tank; (2) media (sand) that captures the dirt and debris from the pool water as it flows through; and (3) laterals that are located under the media and allows the pool water to exit the tank and flow back to the pool.

Relatively little is known about the capabilities of common swimming pool filters to remove waterborne pathogens. Recent research has found that swimming pool sand filters typically remove approximately 25% of *Cryptosporidium* oocysts. These levels of removal are inadequate to prevent outbreaks of cryptosporidiosis, which is supported by number of outbreaks detected and investigated each year by the Centers for Disease Control and Prevention (CDC).

Pool filters tend to be designed for keeping swimming pools looking clear and beautiful, which is not the same as removing all of the waterborne pathogens. The swimming pool industry has traditionally relied on disinfectants, such as chlorine, to control the spread of waterborne diseases. The drinking water industry did largely the same thing until chlorine-resistant pathogens forced changes in the 1980's (for *Giardia*) and the 1990's and beyond (for *Cryptosporidium*). The chlorine-resistant pathogens forced the drinking water industry to put considerable emphasis on filtration optimization to achieve physical removal of these pathogens. US drinking water regulations are continuing to become more and more stringent on pathogen removal in order to safeguard public health. The swimming pool industry could consider taking the same approach.

What is desired is an improved swimming pool sand filter that offers the ease and low cost of a conventional sand filter and further offers improved removal of pathogens, including *Cryptosporidium*.

SUMMARY

In one embodiment, a sand filter for use with a swimming pool includes a tank that has a hollow interior space and a top diffuser for allowing spent pool water to enter the tank and for distributing the pool water inside the tank. The sand filter also includes filter media formed as a bed of material on a bottom of the tank and also includes laterals that are located under the filter media and allow filtered pool water to exit the tank and flow back to the pool. The filter media includes a bed of sand that is disposed on the bottom of the tank and a layer of perlite material that is disposed on a top surface of the bed of sand. The perlite material is a high flow rate, low density perlite material that only contains a trace amount of floaters.

In another embodiment, a method of at least substantially eliminating *Cryptosporidium* organisms from pool water includes the step of: passing pool water through a sand filter to generate filtered pool water. The filter includes a filter media that has a bed of sand that is disposed on a bottom of a tank of the filter and a layer of perlite material that is disposed on a top surface of the bed of sand. The perlite material is a high flow rate, low density perlite material that only contains a trace amount of floaters. In one embodiment, between about 97% and about 99% of the *Cryptosporidium* organisms are removed from the filtered water by passing the pool water through the sand filter that utilizes the perlite material.

In yet another embodiment, a method is provided for forming a sand/perlite layered filter media in a sand filter that is part of a swimming pool that includes a skimmer. The method includes the steps of: (a) adding sand to the bottom of a tank of the sand filter to form a bed of sand; (b) operating the sand filter so that water passes therethrough; and (c) adding a predetermined amount of perlite material through an inlet of the skimmer that is in communication with pool water, while the sand filter is operating, resulting in the perlite material being added as a layer to a top surface of the bed of sand.

It will also be appreciated that the filter media of the present invention also serves to "polish" the water and improve the characteristics of the water, such as water clarity, etc.

These and other aspects, features and advantages shall be apparent from the accompanying drawings and description of certain embodiments of the invention.

BRIEF DESCRIPTION OF THE DRAWINGS

The present invention is illustrated by way of example and not by way of limitation in the figures of the accompanying drawings in which like references indicate similar elements.

FIG. 1 is a side, partial cross-sectional, view of a pool filter system according to one embodiment of the present invention;

FIG. 2 is bar graph showing percent removals of *Cryptosporidium*-sized microspheres for individual sand filter experiments (with and without the perlite material of the present invention);

FIG. 3 is a bar graph showing mean percentage removals of *Cryptosporidium*-sized microspheres for sand filter experiments (with and without perlite material of the present invention);

FIG. 4 is a bar graph showing log removals of *Cryptosporidium*-sized microspheres for individual sand filter experiments (with and without perlite material of the present invention); and FIG. 5 is a bar graph showing mean log removals of *Cryptosporidium*-sized microspheres for sand filter experiments (with and without perlite material of the present invention).

DETAILED DESCRIPTION OF EMBODIMENTS

FIG. 1 illustrates a conventional swimming pool sand filter 100. The filter 100 includes a vessel or tank 110 that typically has a dome construction. The tank 110 has a top 112 and an opposite bottom 114 with a removable cover or lid 120 being located at the top 112. The filter 100 is operatively and fluidly connected to plumbing, generally shown at 200, that both delivers dirty pool water to the tank 110 and also delivers the filtered water back to the pool. The plumbing 200 includes a top diffuser 210 which is located spaced from the top 112 of the tank 110. The top diffuser 210 allows the pool water to enter the tank 110 and distributes the water inside the tank 110. The filter 100 also includes filter media 220 which in the case of a sand filter is sand. The sand 220 is formed as a bed on the bottom 114 of the tank 110. The sand 220 captures the dirt and debris from the pool water as it flows through the tank 110. The filter 100 also includes laterals 230 that are located under the media 220 and allow the pool water to exit the tank 110 and flow back to the pool.

In accordance with the present invention, the filter media for use in the sand filter 100 not only includes the bed of sand 220 but it also includes a layer 300 of specially processed perlite. In particular, the perlite layer 300 is disposed on a top surface of the bed of sand 220. The perlite layer 300 is thus the topmost layer of the filter media.

One source of the perlite layer 300 is commercially available from Industrial Insulation Group (IIG) of Brunswick, Ga. under the trade name Pool Polish. Pool Polish is a perlite material that has been expanded and milled to have a desired, optimal particle size that is particularly well suited for use in pool filters as the present applicant has found. The technical data for this material is as follows: (1) color: white filteraid powder, codex food grade; (2) NSF approved; (3) brightness: GE, dry, 82-85; (4) specific gravity: 2.3; (5) wet apparent density: 8.5 to 9.5 lbs/cubic foot; (6) loose weight density: 5.5 to 6.5 lbs/cubic foot; (7) pH: 7; (8) ignition loss (1 hr @1200° F.); and (9) permeability of 3.25 Darcy units. In one embodiment, the weight of the perlite material is about 0.25 lbs/$ft^2$ (or 25 lbs/100 $ft^2$); however, it will be appreciated that this is merely an exemplary value and other weight ranges can equally be used so long as the properties disclosed herein are realized.

The perlite layer 300 (e.g., a layer derived from Pool Polish) has unique properties that provide superior filtering capabilities, including the elimination of potentially harmful bacteria, and in particular, the perlite layer 300 is a high flow rate, low density perlite filter powder that only contains trace amounts of floaters. Other conventional perlite materials do not have a combination of these advantageous properties. The perlite layer 300 has to have large enough particles to bridge the opening of the intersticies between the sand particles on the surface on which the perlite layer 300 is formed. The perlite layer 300 has an optimal particle distribution that results in the formed layer 300 being in the form of a cake layer that does not penetrate too far into the sand bed. The density of the perlite layer 300 is important because the back wash capability of the sand filter 100 is limited by design to sweep away small debris but not be too strong to wash the sand out of the filter 100. When the filter 100 is back washed, the filter 100 changes the direction of the pump flow and percolates up through the sand, thereby washing it. If the perlite layer 300 is formed of a heavier density perlite material as is commonly available or DE, the material will simply roll around with the sand and not get washed out. It appears that the composition/physical shapes of DE (because it is flux calcined) develops an attraction with the sand and also lodges itself in the intersticies. As is known in the art, floaters are unbroken perlite balls that float naturally and aggressively to the surface of any liquid. Since the tank 110 is dome shaped, ordinary perlite, that typically includes a significant percentage of floaters, will not become part of the filter surface (i.e., the top surface of the sand bed) but instead will float in the water toward and to the surface of the water. This floating action by the floaters impedes the flow of the water on to the perlite layer 300 which is in cake form. The presence of floaters can eventually lead to plugging of the dome and the back wash valve at the top of the tank 110. For this reason, ordinary perlite filter powder contains floaters at high flow level and therefore is not particularly suited for forming the perlite layer 300 and clearly will lead to inferior filter performance when compared to the perlite/sand filter media in accordance with the present invention. Even conventional perlite filter powder that is available with little or no floats is not suitable for use in the filter media of the present invention since the other properties of the powder are inferior and in particular, the flow rate is too low and the particles are far too small to effectively work in the filter media of the filter 100 of the present invention. This results in clogging of the filter.

The present applicant has accordingly discovered that the perlite disclosed herein has properties that provide a syngerstic effect when combined with pool filter materials and provides unexpected results when incorporated into a pool filter.

In yet another aspect, a method of forming the layered filter media 220 is described in detail below.

A pool skimmer, generally shown at 400 in FIG. 1, is part of the overall pool filter system. The pool skimmer 400 is located in the wall of the pool and is connected to the pool's suction pump that is part of the pool's plumbing. The skimmer 400 thus acts to draw water from the pool via a rectangular aperture in the wall connected through to a device fitted into one (or more) wall/s of the pool. The internals of the skimmer 400 are accessed from the pool deck through a circular or rectangle lid, about one foot in diameter. On lifting the lid (if the pool is operational) one will see water being drawn from the pool, over a floating weir (operating from a vertical position to 90 degrees angle away from the pool, in order to stop leaves and debris being back-flooded into the pool by wave action), and down into a removable "skimmer basket," the purpose of which is to entrap leaves and other floating debris. The aperture visible from the pool side is typically 1' 0" wide by 6" high, which intersects the water midway though the center of the aperture. However, other sized skimmers, such as "wide angle" skimmers can be used. The skimmer 400 should have a leaf basket or filter between it and the pump to avoid blockages in the pipes leading to the pump and filter 100.

In accordance with the present invention, the perlite material is introduced into the filter tank 110 in a manner that causes the perlite material to form a cake-like structure on the top surface of the sand bed without having to access the interior of the tank 110. More specifically, the perlite material is introduced through the skimmer of the pool. Since the skimmer mechanism immediately feeds the filter and the perlite material is of the type that can safely pass through the skimmer, the perlite material is easily and effectively introduced directly into the tank 110 and the filtering action therein in combination with the specific properties of the perlite material results in the perlite material being deposited onto the top surface of the sand bed to advantageously form the cake-like layer of perlite.

Advantageously, the method does not involve the step of opening the filter tank 110 to access the filter media since this is a time consuming, involved process that requires shutting down the filter equipment, etc.

In yet another aspect of the present invention, the perlite layer 300 can be provided to the consumer in prepackaged amounts in sealed plastic bags. The package is designed so that it includes instructions that are based on labeled square footage of the filter. In other words, the amount of perlite material in the package is correlated to a square footage of the filter. The user can then simply determine how many bags to add. When the perlite material comes in prepackaged amounts (e.g., in sealed plastic bags), the user simply opens up the package and dumps the perlite material into the skimmer 400, thereby causing the perlite material to be layered on the sand bed as described above.

In one embodiment, the perlite is applied in an amount of ¼ lb per sq. ft. of filter surface area. It will be understood that this ratio is merely exemplary and that other ratios can be used in the practice of the present invention.

The following example illustrates the application of the perlite/sand filter media according to the present invention in a sand type filter.

EXAMPLE

A 200 gallon (757 L) spa with a sand filter was used at room temperature for this exemplary run. The filter and the pump were commercially-available products (Pentair Challenger 3 HP pump; Pentair Triton TR40 sand filter). Only one type of precoat media was used in this run (Industrial Insulation Group, LLC, Tech-Flo Perlite Filteraid, permeability 3.25 Darcys). The spa system was pumped water at 38 gpm (144 L/min), and the flow was measured with a digital flow meter (Scienco Products, Model SEM-40 electronic flow meter) and controlled with a 2-inch (51 mm) diameter PVC ball valve. Inline feed of the microsphere suspensions was made possible by a digital peristaltic pump (Watson Marlow, Model 505Di) feeding directly into the PVC pipe just upstream of the pump. The microsphere suspensions were prepared in a 1-L glass Erlenmeyer flask of simulated pool water and stirred continuously with a magnetic stirrer (Barnstead/Thermolyne, Cimarec® Digital Stirring Hot Plate) and Teflon®-coated stir bar prior to and during the runs.

Simulated pool water was created for each experiment from 200 gallons (757 L) of Charlotte, N.C. (US) tap water supplemented with sodium bicarbonate to an alkalinity of 150 mg/L as $CaCO_3$, with calcium chloride to a hardness of 250 mg/L as $CaCO_3$, with sodium hypochlorite to a free chlorine concentration of 2 mg/L, with hydrochloric acid to a pH of 7.5, and with a mixture of artificial sweat and urine to a final total organic carbon concentration of 20 mg/L as C. Runs were performed in duplicate, and duplicate samples were collected during each run from the filter influent and filter effluent pipes. Approximately $2 \times 10^7$ YG fluorescent carboxylate-modified polystyrene microspheres (Polysciences, Inc, Cat. #16592, 4.869 µm, std. dev. 0.246 µm) were used in each run. The 1 L microsphere suspension was fed in at 50 mL/min during the experiment to achieve a filter influent concentration of approximately 6.95 microspheres per mL, of water Influent samples of 50 mL were collected in sterile 50 mL conical-bottomed plastic centrifuge tubes (Falcon® Blue-Max™ Order #352074), and the volume of the effluent samples varied from 50 mL to 500 mL with the larger samples collected in Wheaton glass media bottles.

Samples were stored at 4° C. after collection and prior to analysis. Sample volumes analyzed were adjusted to obtain between 10 and 150 oocysts and/or microspheres per sample. Samples were filtered through 3-µm polycarbonate track-etched (PCTE) filters (GE, Order #K30CP02500) in 25-mm glass microanalysis filter funnels (Millipore Model xx10 025 00) by a regulated 3-place vacuum manifold. The filters were mounted on glass micro slides (Gold Seal® Order #3058) with one drop of polyvinyl alcohol-DABCO solution (Freer, 1984) and a glass cover slip (Corning, 25-mm square, No. 1.5) for enumeration under epifluorescent microscope (Zeiss Standard 25 microscope) at 100× total magnification. The fluorescent filter set had a 450-490-nm excitation wavelength range, a 510-nm dichroic filter, and a 520-nm emission filter. The spa system was thoroughly cleaned between runs with a minimum of three drain-and-fill rinses with recirculation at 60 gpm (227 L/min), and samples were collected prior to seeding in each run to measure any potential carryover between runs. The run schedule was staggered between sand and sand-perlite runs in successive experiments.

Filter removal percentages are shown in FIG. 2 for each experiment in this study. The results demonstrated that a standard sand filter (without perlite) was not very efficient at removing *Cryptosporidium*-sized particles with removals ranging from 6 to 41% with a mean of only 19% (as shown in FIG. 2). The same sand filter with a thin layer of perlite media in accordance with the present invention on top of the sand bed demonstrated good removal capabilities of *Cryptosporidium*-sized particles with mean removals ranging from 97 to 99% with a mean of 98.4% as shown in FIGS. 2 and 3. The error bars in FIG. 3 represent one standard deviation of the data above and below the mean value.

FIGS. 4 and 5 display the same data as FIGS. 2 and 3, but the removals are calculated and displayed as Log removals instead of percentages. The results showed that a standard sand filter (without perlite) was again not very efficient at removing *Cryptosporidium*-sized particles with removals ranging from 0.03 to 0.23 Log with a mean of 0.09 Log. The sand filter with a thin layer of perlite media on top demonstrated good removal capabilities of *Cryptosporidium*-sized particles with mean removals ranging from 1.59 to 2.10 Log with a mean of 1.79 Log. The error bars represent one (Log transformed) standard deviation of the data above and below the mean.

The above results indicate that adding the perlite material disclosed herein (in the amount of ¼ lb per sq. ft. of filter surface area) to a sand filter significantly improved the removal of *Cryptosporidium*-sized particles. Removals averaged less than 20% through sand filters without perlite, but the mean removal increased to greater than 98% when perlite was added to the filter. The filter loading rates remained constant in this example at 20 µm/ft$^2$.

As used herein, the term "trace amount of floaters" refers to perlite materials that have less than 1% floaters by volume, preferably less than 0.5% floaters and more preferably less than 0.25% floaters.

As used herein, the term "substantially eliminating" refers to an elimination of 97% or greater in the total count of an object/element, such as bacteria.

In yet another aspect of the present invention, a cost savings in electricity charges is realized since the pool filter 100 does not have to be run as often and/or can be run for shorter treatment/filtering times due to the improved filtering capabilities of the filter of the present invention. This is a result of the increased effectiveness of the filter 100 in filtering unwanted matter, including the above-described pathogens. The sand filter of the present invention is also cleaner and safer than conventional sand filters.

It will also be appreciated that the filter media of the present invention also serves to "polish" the water and improve the characteristics of the water, such as water clarity, etc. As a result, the filter media has the commercial product name of "Pool Polish."

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A sand filter for use with swimming pools comprising:
a tank that has a hollow interior space;
a top diffuser for allowing spent pool water to enter the tank and for distributing the pool water inside the tank;
filter media formed as a bed of material on a bottom of the tank; and
laterals that are located under the filter media and allow filtered pool water to exit the tank and flow back to the pool;
wherein the filter media includes a bed of sand that is disposed on the bottom of the tank and a layer of perlite material that is disposed on a top surface of the bed of sand, the perlite material being a high flow rate, low density perlite material that only contains a trace amount of floaters.

2. The sand filter of claim 1, wherein the perlite material has a specific gravity of about 2.3; a wet apparent density between about 8.5 to 9.5 lbs/cubic foot; a loose weight density between about 5.5 to 6.5 lbs/cubic foot; and a Darcy units of about 3.25.

3. The sand filter of claim 1, wherein a weight of the perlite material is about 0.25 lbs/ft$^2$.

4. The sand filter of claim 1, wherein the layer of perlite material comprises a cake structure of perlite material.

5. A method of at least substantially eliminating *Cryptosporidium* organisms from pool water comprising the steps of:
passing pool water through a sand filter to generate filtered pool water, wherein the sand filter includes a filter media comprising a bed of sand that is disposed on a bottom of a tank of the filter and a layer of perlite material that is disposed on a top surface of the bed of sand, the perlite material being a high flow rate, low density perlite material that only contains a trace amount of floaters.

6. The method of claim 5, wherein the perlite material is added in an amount of ¼ lb per sq. ft. of filter surface area.

7. The method of claim 5, wherein the filtered water is at least 98% free of the *Cryptosporidium* organisms.

8. The method of claim 5, wherein between about 97% and about 99% of the *Cryptosporidium* organisms are removed from the filtered water by passing the pool water through the sand filter.

9. A method of forming a sand/perlite layered filter media in a sand filter that is part of a swimming pool that includes a skimmer, comprising the steps of:
adding sand to the bottom of a tank of the sand filter to form a bed of sand;
operating the sand filter so that water passes therethrough; and
adding a predetermined amount of perlite material through an inlet of the skimmer that is in communication with pool water, while the sand filter is operating, resulting in the perlite material being added as a layer to a top surface of the bed of sand.

10. The method of claim 9, wherein the perlite material is a high flow rate, low density perlite material that only contains a trace amount of floaters.

11. The method of claim 9, wherein the perlite material has a specific gravity of about 2.3; a wet apparent density between about 8.5 to 9.5 lbs/cubic foot; a loose weight density between about 5.5 to 6.5 lbs/cubic foot; and a Darcy units of about 3.25.

12. The method of claim 9, wherein a weight of the perlite material is about 0.25 lbs/ft$^2$.

13. The method of claim 9, wherein the layer of perlite material comprises a cake structure of perlite material.

14. The method of claim 9, wherein the perlite material is prepackaged in a package that includes a label that equates the amount of perlite material in the package to a square footage of the filter.

* * * * *